(12) United States Patent
Chun et al.

(10) Patent No.: US 11,679,864 B2
(45) Date of Patent: Jun. 20, 2023

(54) PROPELLER APPARATUS OF AIR MOBILITY

(71) Applicants: Hyundai Motor Company, Seoul (KR); Kia Corporation, Seoul (KR)

(72) Inventors: Yun Bae Chun, Gyeonggi-do (KR); Youn Sic Nam, Daejeon (KR); Kwang Cheol Han, Gyeonggi-do (KR); Keon Woo Kim, Gyeonggi-do (KR); Jay Young Yoon, Gyeonggi-do (KR); Kwan Ho Moh, Gyeonggi-do (KR); Young Heon Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/696,511

(22) Filed: Mar. 16, 2022

(65) Prior Publication Data

US 2022/0402595 A1 Dec. 22, 2022

(30) Foreign Application Priority Data

Jun. 18, 2021 (KR) .................. 10-2021-0079274

(51) Int. Cl.
*B64C 11/28* (2006.01)
(52) U.S. Cl.
CPC .................. *B64C 11/28* (2013.01)

(58) Field of Classification Search
CPC ......... B64C 11/28; B64C 11/00; B64C 27/50; B64C 27/022; B64C 3/56
See application file for complete search history.

(56) References Cited

U.S. PATENT DOCUMENTS

| | | | |
|---|---|---|---|
| 6,260,798 B1* | 7/2001 | Casiez | B64C 39/024 244/172.6 |
| 6,260,799 B1* | 7/2001 | Russ | B64C 3/56 244/49 |
| 8,985,504 B2* | 3/2015 | Tao | B64C 9/36 244/3.28 |
| 9,469,392 B2* | 10/2016 | Fox | B64C 3/56 |
| 11,292,595 B2* | 4/2022 | Meringer | B64C 39/024 |
| 11,305,864 B2* | 4/2022 | Lorenz | B64C 3/56 |
| 2020/0079492 A1* | 3/2020 | Noskowicz | B64C 9/00 |
| 2020/0269971 A1* | 8/2020 | Xi | B64C 23/072 |

FOREIGN PATENT DOCUMENTS

| | | |
|---|---|---|
| CN | 205311899 U | 6/2016 |
| CN | 111252237 A | 6/2020 |
| KR | 2020-0104582 A | 9/2020 |

* cited by examiner

*Primary Examiner* — Courtney D Heinle
*Assistant Examiner* — Andrew Thanh Bui
(74) *Attorney, Agent, or Firm* — Fox Rothschild LLP

(57) ABSTRACT

A propeller apparatus of an air mobility is arranged such that a propeller is configured to fold when the air mobility crashes, thereby preventing additional accidents caused by fragments generated by the propeller hitting the ground, and enabling the propeller to be reused by unfolding the folded propeller after the air mobility lands.

17 Claims, 5 Drawing Sheets

PROPELLER APPARATUS OF AIR MOBILITY

CROSS REFERENCE TO RELATED APPLICATION

The present application claims under 35 U.S.C. § 119(a) the benefit of Korean Patent Application No. 10-2021-0079274 filed on Jun. 18, 2021, the entire contents of which are incorporated by reference herein.

BACKGROUND

(a) Technical Field

The present disclosure relates to a propeller apparatus of an air mobility, which can prevent injury and/or property damage caused by scattering of a propeller when the air mobility crashes.

(b) Description of the Related Art

Recently, an air mobility vehicle (or "air mobility") usable in various fields, such as a cargo container transportation and medical transportation, is under development, and energy efficiency and stabilization of the air mobility have been developed and the air mobility is approaching a stage of practical use.

The air mobility flies by driving a propeller, and stability in a crash situation of the air mobility is essentially required. Therefore, the air mobility selectively adjusts driving of the propeller for potentially avoiding the crash situation, but there is no safety countermeasure against a situation where the air mobility finally falls, i.e., crashes.

For example, upon crashing of the air mobility, each rotated propeller hits the ground, and there is a problem in that fragments are generated and scattered as the quickly rotating propeller hits the ground, thereby causing secondary accidents.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a propeller apparatus of an air mobility, which can prevent additional accidents caused by scattering of a propeller when the air mobility crashes.

A propeller apparatus of an air mobility for achieving the object includes a wing composed of a fixed part and a rotation part deployed from or folded on the fixed part; a hinge mechanism rotatably connected to the fixed part and the rotation part to have a first rotation center of the fixed part and a second rotation center of the rotation part, and providing an elastic force such that the rotation part is folded while being rotated toward the fixed part; a movable bar spaced apart from the hinge mechanism to be movably provided, and having a third rotation center selectively matched with the first rotation center and the second rotation center according to a movement position of the movable bar; and a driving mechanism installed on the fixed part and the rotation part, connected to the movable bar, allowing the third rotation center of the movable bar not to be matched with the first rotation center and the second rotation center when the rotation part is deployed, and moving the movable bar to allow the third rotation center of the movable bar to be matched with the first rotation center and the second rotation center upon a request for folding of the rotation part, such that the rotation part is rotated by the elastic force of the hinge mechanism.

The wing is disposed such that the end of the fixed part and the end of the rotation part face, and each end of the fixed part and the rotation part is formed with a plurality of opening holes matched with each other, and therefore, the hinge mechanism and the movable bar are provided in the opening holes.

On each end of the fixed part and the rotation part, a guide part extends from the opening hole provided with the movable bar among the plurality of opening holes, and the movable bar is connected to the guide part to be moved on the guide part.

The movable part has each of one end and another end rotatably and movably connected to each guide part of the fixed part and the rotation part.

Each opening hole extends to be longer than a rotation radius of the hinge mechanism and a rotation radius of the movable bar.

The hinge mechanism includes a hinge bar having one end connected to the fixed part with the first rotation center and another end connected to the rotation part with the second rotation center; and an elastomer provided in the hinge bar to provide an elastic force to the hinge bar in a direction in which the rotation part is folded.

The elastomer is composed of one side elastomer connected to one end of the hinge bar and the fixed part and another side elastomer connected to another end of the hinge bar and the rotation part, and one side elastomer and another side elastomer generate the elastic forces in the direction in which the rotation part is folded.

The driving mechanism is installed on the fixed part and connected to one end of the movable bar, and a support mechanism connected to another end of the movable bar is installed on the rotation part.

The driving mechanism includes a driving part installed on the fixed part; a driving cam part rotated upon operation of the driving part; and a driving rod part rotatably connected to the driving cam part and one end of the movable bar to move the movable bar upon rotation of the driving cam part.

The support mechanism includes a connection cam part rotatably installed on the rotation part; and a connection rod part rotatably connected to the connection cam part and another end of the movable bar to support the movable bar and guiding the movable bar moved by an operation of the driving mechanism.

The driving mechanism is composed of a first driving mechanism installed on the fixed part and connected to one end of the movable bar, and a second driving mechanism installed on the rotation part and connected to another end of the movable bar.

The first driving mechanism includes a first driving part installed on the fixed part; a first cam part rotated upon operation of the first driving part; and a first rod part rotatably connected to the first cam part and one end of the movable bar to move the movable bar upon rotation of the first cam part.

If a plurality of movable bars are provided, the first cam part is arranged in the same number as that of the movable bar, and the respective first cam parts are connected by a first connection rod to be simultaneously rotated by the first driving part.

The second driving mechanism includes a second driving part installed on the rotation part; a second cam part rotated upon operation of the second driving part; and a second rod part rotatably connected to the second cam part and another end of the movable bar to move the movable bar upon rotation of the second cam part.

If a plurality of movable bars are provided, the second cam part is arranged in the same number as that of the movable bar, and the respective cam parts are connected by a second connection rod to be simultaneously rotated by the second driving part.

The rotation part is installed to be rotated upward from the fixed part via the hinge mechanism.

The driving mechanism is operated such that the movable bar is moved upon receiving a signal generated by the crash of the air mobility through a control part.

The propeller apparatus of the air mobility having the aforementioned configuration may fold the propeller when the air mobility crashes, thereby preventing additional accidents caused by fragments generated by the propeller hitting the ground, and allowing the propeller to be reused by unfolding the folded propeller after the air mobility lands.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a propeller apparatus of an air mobility according to a preferred exemplary embodiment of the present disclosure will be described with reference to the accompanying drawings.

Figure 1:
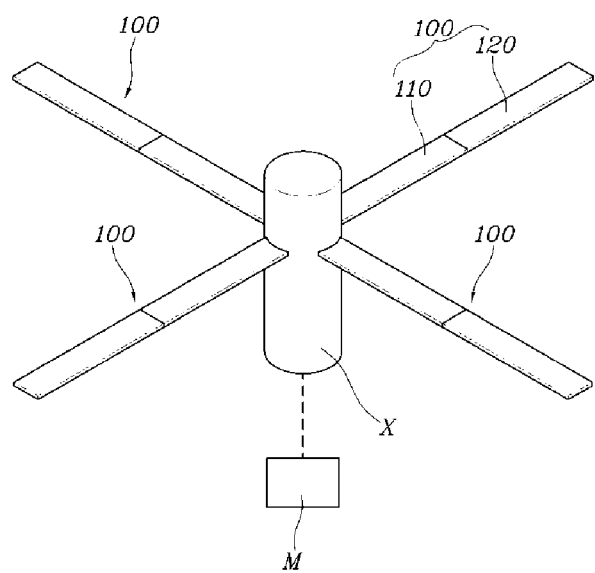
FIG. 1 is a diagram illustrating a propeller apparatus of an air mobility according to the present disclosure.
Figure 2:
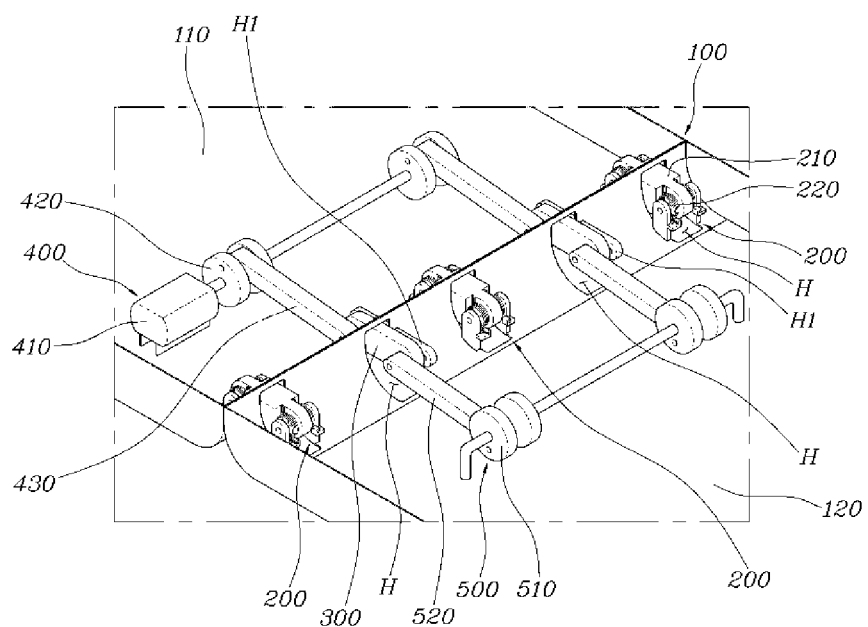
FIG. 2 is a diagram illustrating an exemplary embodiment of a hinge mechanism, a movable bar, and a driving mechanism of the propeller apparatus of the air mobility illustrated in FIG. 1.
Figure 3:
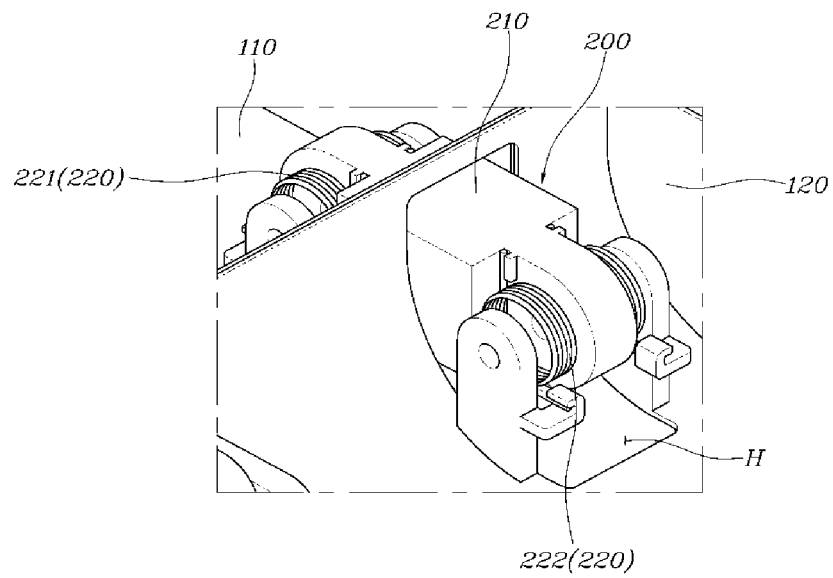
FIG. 3 is a diagram illustrating the hinge mechanism.
Figure 4:
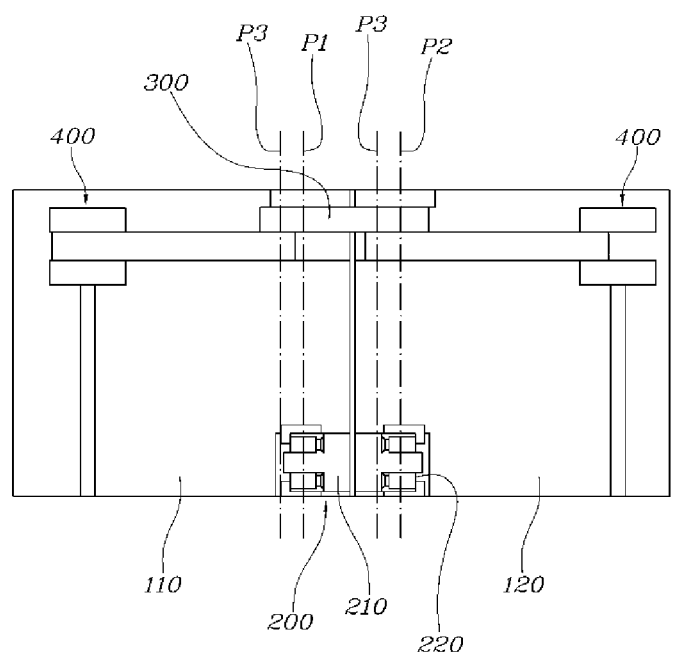
FIG. 4 is a diagram illustrating a state before the movable bar and the driving mechanism are operated.
Figure 5:
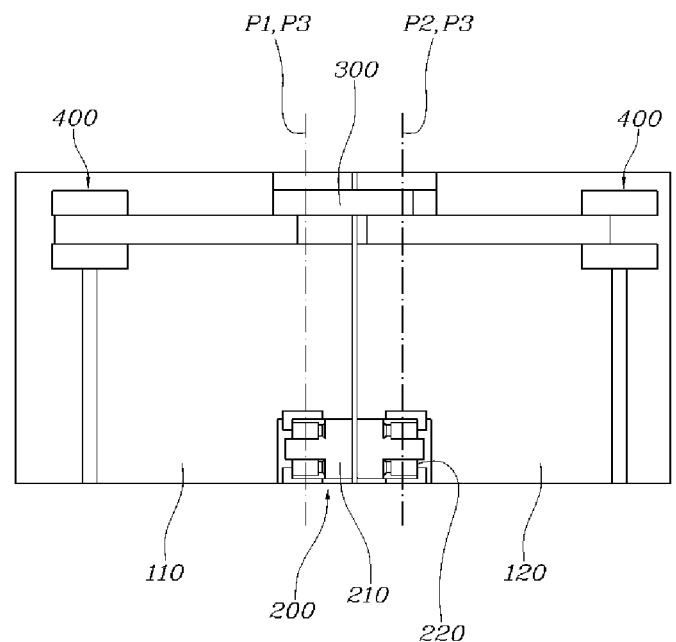
FIG. 5 is a diagram illustrating a state after the movable bar and the driving mechanism are operated.
Figure 6:
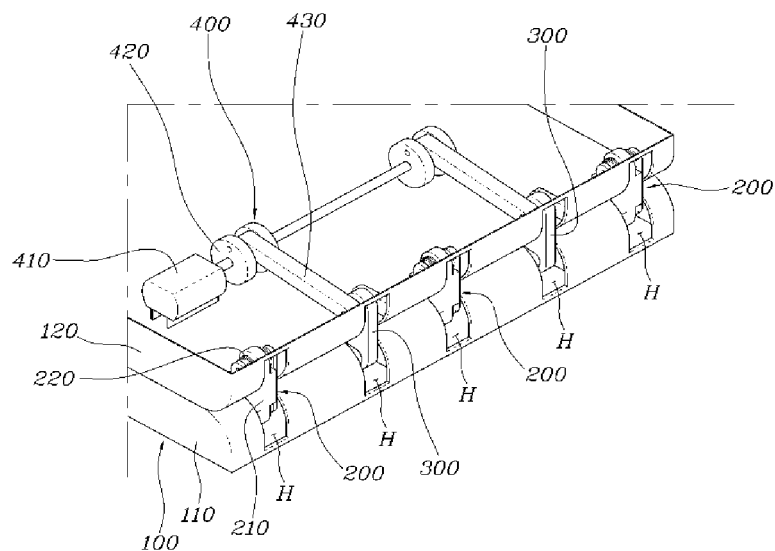
FIG. 6 is a diagram illustrating a state where a rotation part is rotated on a fixed part.
Figure 7:
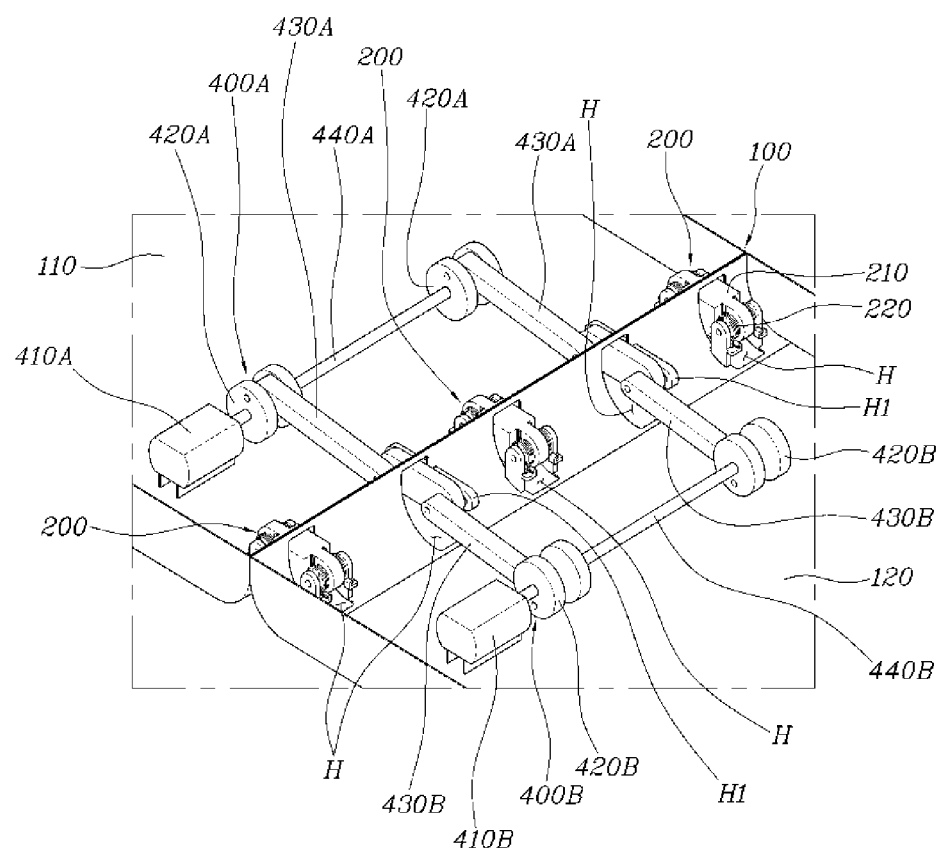
FIG. 7 is a diagram illustrating another exemplary embodiment of the hinge mechanism, the movable bar, and the driving mechanism of the propeller apparatus of the air mobility illustrated in FIG. 1.
Figure 8:
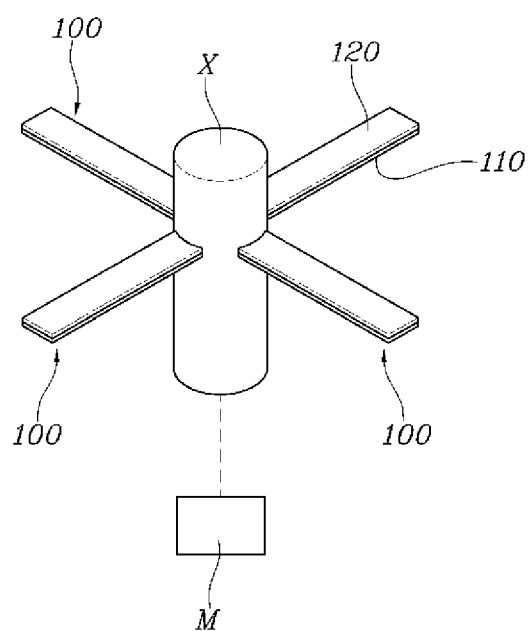
FIG. 8 is a diagram illustrating a state where a rotation part is rotated on a fixed part.

FIG. 1 is a diagram illustrating a propeller apparatus of an air mobility according to the present disclosure, FIG. 2 is a diagram illustrating an exemplary embodiment of a hinge mechanism, a movable bar, and a driving mechanism of the propeller apparatus of the air mobility illustrated in FIG. 1, FIG. 3 is a diagram illustrating the hinge mechanism, FIG. 4 is a diagram illustrating a state before the movable bar and the driving mechanism are operated, FIG. 5 is a diagram illustrating a state after the movable bar and the driving mechanism are operated, FIG. 6 is a diagram illustrating a state where a rotation part is rotated on a fixed part, FIG. 7 is a diagram illustrating another exemplary embodiment of the hinge mechanism, the movable bar, and the driving mechanism of the propeller apparatus of the air mobility illustrated in FIG. 1, and FIG. 8 is a diagram illustrating a state where a rotation part is rotated on a fixed part.

As illustrated in FIGS. 1 to 6, a propeller apparatus of an air mobility according to the present disclosure includes a wing 100 composed of a fixed part 110 and a rotation part 120 deployed from or folded on the fixed part 110; a hinge mechanism 200 rotatably connected to the fixed part 110 and the rotation part 200 to have a first rotation center P1 of the fixed part 110 and a second rotation center P2 of the rotation part 120, and providing an elastic force such that the rotation part 120 is folded on the fixed part while being rotated toward the fixed part 110; a movable bar 300 spaced apart from the hinge mechanism 200 to be movably provided, and having a third rotation center P3 selectively matched with the first rotation center P1 and the second rotation center P2 according to a movement position of the movable bar 300; and a driving mechanism 400 installed on the fixed part 110 and the rotation part 120, connected to the movable bar 300, allowing the third rotation center P3 of the movable bar 300 not to be matched with the first rotation center P1 and the second rotation center P2 when the rotation part 120 is deployed, and moving the movable bar 300 to allow the third rotation center P3 of the movable bar 300 to be matched with the first rotation center P1 and the second rotation center P2 upon a request for folding of the rotation part 120, thereby allowing the rotation part 120 to be rotated by the elastic force of the hinge mechanism 200.

A plurality of wings 100 may be installed on a driving shaft X of an air mobility, and a driving motor M is mounted on the driving shaft X to generate a thrust as the wing 100 is rotated by the rotation of the driving shaft X.

In particular, the wing 100 according to the present disclosure is separately composed of the fixed part 110 and the rotation part 120, and the rotation part 120 is deployed from or folded on the fixed part 110. In other words, the wing 100 generates the thrust by the rotation if the rotation part 120 is deployed from the fixed part 110, and if the rotation part 120 is folded on the fixed part 110, the wing 100 is prevented from being hit on the ground upon occurrence of the landing accident as the entire length of the wing 100 is reduced.

For the folding operation of the wing 100, the hinge mechanism 200 is installed on the fixed part 110 and the rotation part 120, and therefore, the rotation part 120 is rotated via the hinge mechanism 200. In other words, the hinge mechanism 200 has the first rotation center P1 of the fixed part 110 and the second rotation center P2 of the rotation part 120, and therefore, the rotation part 120 may be rotated on the fixed part 110 through each rotation center. Further, as the hinge mechanism 200 provides the elastic force such that the rotation part 120 is folded on the fixed part 110 while being rotated toward the fixed part 110, the rotation part 120 may be rotated toward the fixed part 110.

Here, the rotation part 120 may be folded while being rotated toward the fixed part 110 by the movable bar 300 and the driving mechanism 400.

In other words, the movable bar 300 is provided to be spaced apart from the hinge mechanism 200, and has the third rotation center P3 selectively matched with the first rotation center P1 and the second rotation center P2 according to the movement position of the movable bar 300.

The movable bar 300 is connected to the driving mechanism 400 installed on the fixed part 110 and the rotation part 120, such that the movable bar 300 is moved depending upon the operation of the driving mechanism 400 to allow the rotation part 120 to be selectively rotated with respect to the fixed part 110. In other words, in a state where the rotation part 120 is deployed from the fixed part 110, as the third rotation center P3 of the movable bar 300 is not matched with the first rotation center P1 of the fixed part 110 and the second rotation center P2 of the rotation part 120 of the hinge mechanism 200, the hinge mechanism 200 may not be rotated because the rotation centers of the hinge mechanism 200 and the rotation center of the movable bar 300 are not matched with each other. Here, the driving mechanism 400 is operated and as the movable bar 300 is moved, the rotation center of the movable bar 300 is matched with the rotation centers of the hinge mechanism 200 if the third rotation center P3 of the movable bar 300 is matched with the first rotation center P1 and the second rotation center P2 of the hinge mechanism 200. Therefore, the movable bar 300 and the rotation part 120 may be rotated. As a result, the rotation part 120 may be rotated by the elastic force of the hinge mechanism 200, and therefore, the rotation part 120 may be folded.

The aforementioned driving mechanism 400 may be operated such that the movable bar 300 is moved when receiving a signal generated by the crash of the air mobility through a control part. In other words, the driving mechanism 400 is operated by a control of the control part, and the control part determines whether the air mobility crashes by collecting information such as the altitude and slope of the air mobility through various sensors provided in the air mobility. Therefore, when determining that the air mobility crashes, the control part delivers the signal generated by the crash of the air mobility to the driving mechanism 400 such that the driving mechanism 400 is operated. Therefore, the movable bar 300 is moved to allow the rotation part 120 to be folded by the hinge mechanism 200.

Further, the rotation part 120 may be installed to be rotated upward from the fixed part 110 via the hinge mechanism 200. According to the present disclosure, the rotation part 120 is folded in a situation where the air mobility crashes, and when the air mobility crashes, the air flows from bottom to top. Therefore, the rotation part 120 is installed to be rotated upward from the fixed part 110 via the hinge mechanism 200, such that the rotation part 120 is quickly folded in the situation where the air mobility crashes. As a result, the present disclosure can prevent accidents caused by the scattering of fragments generated by the wing 100 hitting the ground, or the rotation of the wing 100 in the situation where the air mobility crashes.

Specifically describing the aforementioned present disclosure, the wing 100 is disposed such that the end of the fixed part 110 and the end of the rotation part 120 face each other, and the respective ends of the fixed part 110 and the rotation part 120 are formed with a plurality of opening holes H which are matched with each other, and therefore, the hinge mechanism 200 and the movable bar 300 may be provided in the opening holes H.

As illustrated in FIG. 2, the respective ends of the fixed part 110 and the rotation part 120 are disposed to face each other, and the end of the fixed part 110 and the end of the rotation part 120 are formed with the plurality of opening holes H matched with each other, respectively. The respective opening holes H are provided with the hinge mechanism 200 and the movable bar 300, respectively, and therefore, the fixed part 110 and the rotation part 120 are rotatably connected by the hinge mechanism 200 and the movable bar 300.

Here, on each end of the fixed part 110 and the rotation part 120, a guide part H1 extends from the opening hole H provided with the movable bar 300 among the plurality of opening holes H, and the movable bar 300 is connected to the guide part H1 to be moved on the guide part H1. The guide part H1 is formed in the opening hole H provided with the movable bar 300, and each guide part H1 of the fixed part 110 and the rotation part 120 is formed to extend linearly in the state where the rotation part 120 is deployed.

Further, the movable bar 300 may have each of one end and another end rotatably and movably connected to each guide part H1 of the fixed part 110 and the rotation part 120. In other words, as the movable bar 300 may be moved on each guide part H1 of the fixed part 110 and the rotation part 120 and rotated on the guide part H1, the rotation part 120 may be rotated to be folded on the fixed part 110 by the rotation operation of the movable bar 300 and the rotation part 120.

In other words, the movable bar 300 may be linearly moved on the guide part H1 along the guide part H1, and when the movable bar 300 is moved and the third rotation center P3 of the movable bar 300 is matched with the first rotation center P1 and the second rotation center P2 of the hinge mechanism 200, the rotation part 120 is rotated with the movable bar 300, and therefore, the rotation part 120 may be folded.

Meanwhile, each opening hole H may extend to be longer than a rotation radius of the hinge mechanism 200 and a rotation radius of the movable bar 300. As a result, as the hinge mechanism 200 and the movable bar 300 do not interfere with the fixed part 110 or the rotation part 120 upon the rotation operation of the rotation part 120 in the state of being provided in the opening holes H, the rotation part 120 may be smoothly rotated in a direction in which the rotation part 120 is folded or deployed.

Meanwhile, as illustrated in FIG. 3, the hinge mechanism 200 includes a hinge bar 210 having one end connected to the fixed part 110 with the first rotation center P1 and another end connected to the rotation part 120 with the second rotation center P2; and an elastomer 220 provided in the hinge bar 210 to provide an elastic force to the hinge bar 210 in the direction in which the rotation part 120 is folded.

As described above, the hinge mechanism 200 is composed of the hinge bar 210 and the elastomer 220, and one end of the hinge bar 210 is connected to the fixed part 110 and another end of the hinge bar 210 is connected to the rotation part 120, and therefore, the rotation part 120 may be rotated on the fixed part 110 via the hinge bar 210. Further, the hinge bar 210 is formed with the elastomer 220 providing the elastic force to each of the fixed part 110 and the rotation part 120, and therefore, the rotation part 120 may be rotated in the direction in which the rotation part 120 is folded by the elastic force of the elastomer 220.

Here, the elastomer 220 is composed of one side elastomer 221 connected to one end of the hinge bar 210 and the fixed part 110, and another side elastomer 222 connected to another end of the hinge bar 210 and the rotation part 120, and one side elastomer 221 and another side elastomer 222 generate the elastic forces in the direction in which the rotation part 120 is folded.

As described above, as the elastomer 220 is composed of one side elastomer 221 and another side elastomer 222, the hinge bar 210 may be rotated on the fixed part 110 via one side elastomer 221, and the rotation part 120 may be rotated on the hinge bar 210 via another side elastomer 222. In other words, as one side elastomer 221 and another side elastomer 222 generate the elastic forces in the direction in which the rotation part 120 is folded, the hinge bar 210 is rotated by the elastic force of one side elastomer 221 and at the same time, the rotation part 120 is rotated on the hinge bar 210 when the rotation part 120 is folded. Therefore, the rotation part 120 is rotated in the direction of being folded to be folded. Here, for the smooth folding operation of the rotation part 120, one side elastomer 221 may be formed to have the elastic force stronger than that of another side elastomer 222.

Meanwhile, the driving mechanism 400 according to the present disclosure may be applied in various exemplary embodiments.

As a first exemplary embodiment, as illustrated in FIG. 2, the driving mechanism 400 may be installed on the fixed part 110 and connected to one end of the movable bar 300, and a support mechanism 500 connected to another end of the movable bar 300 may be installed on the rotation part 120.

In other words, the driving mechanism 400 installed on the fixed part 110 is connected to one end of the movable bar 300, and therefore, the movable bar 300 is moved upon operation of the driving mechanism 400. Further, the support mechanism 500 is installed on the rotation part 120, and the support mechanism 500 is connected to another end of the movable bar 300, and therefore, the movable bar 300 moved by the driving mechanism 400 is supported by the support mechanism 500. As described above, the movable bar 300 has one end and another end supported by the driving mechanism 400 and the support mechanism 500, respectively, and therefore, upon operation of the driving mechanism 400, the movable bar 300 may be smoothly moved, and the rotation part 120 may be robustly connected to the fixed part 110 by the movable bar 300, the driving mechanism 400, and the support mechanism 500.

Specifically, the driving mechanism 400 includes a driving part 410 installed on the fixed part 110; a driving cam part 420 rotated upon operation of the driving part 410; and a driving rod part 430 rotatably connected to the driving cam part 420 and one end of the movable bar 300 to move the movable bar 300 upon rotation of the driving cam part 420.

Here, the driving part 410 may be a rotation motor, and allows the driving rod part 430 to be moved while the driving cam part 420 is rotated upon operation of the driving part 410. In other words, the driving rod part 430 has one end 430a rotatably connected to the driving cam part 420, and another end 430b rotatably connected to the movable bar 300 such that the movable bar 300 is moved by pushing the movable bar 300 upon movement by the operation of the driving part 410. Therefore, the initial position of the driving rod part 430 is rotated and moved toward the movable bar 300 upon operation of the driving part 410 in a state where the driving rod part 430 is connected to an upper end or a lower end of the driving cam part 420 such that the movable bar 300 is moved.

Meanwhile, the support mechanism 500 includes a connection cam part 510 rotatably installed on the rotation part 120; and a connection rod part 520 rotatably connected to the connection cam part 510 and another end of the movable bar 300 to support the movable bar 300 and to guide the movable bar 300 moved by the operation of the driving mechanism 400.

The connection cam part 510 may be rotatably installed on the rotation part 120, and formed in the same circular shape as that of the driving cam part 420. One end of the connection rod part 520 is rotatably connected to the connection cam part 510, and another end of the connection rod part 520 is rotatably connected to another end of the movable bar 300, thereby guiding the movement of the movable bar 300.

As a result, the driving part 410 of the driving mechanism 400 is operated and as the driving rod part 430 is moved upon rotation of the driving cam part 420, the movable bar 300 is moved together, and the movement of the movable bar 300 is guided by the connection rod part 520 and the connection cam part 510 of the support mechanism 500 provided in the rotation part 120, and therefore, the movable bar 300 may be linearly moved.

Meanwhile, as another exemplary embodiment, as illustrated in FIG. 7, the driving mechanism 400 is composed of a first driving mechanism 400A installed on the fixed part 110 and connected to one end of the movable bar 300; and a second driving mechanism 400B installed on the rotation part 120 and connected to another end of the movable bar 300.

In other words, the first driving mechanism 400A installed on the fixed part 110 is connected to one end of the movable bar 300, and the second driving mechanism 400B installed on the rotation part 120 is connected to another end of the movable bar 300, and therefore, the movable bar 300 is moved by the operations of the first driving mechanism 400A and the second driving mechanism 400B. As a result, the movable bar 300 connects the fixed part 110 to the rotation part 120 by the first driving mechanism 400A and the second driving mechanism 400B, and is moved upon operations of the first driving mechanism 400A and the second driving mechanism 400B. Further, as a plurality of driving mechanisms 400 providing a force for moving the movable bar 300 are formed, the movable bar 300 may be accurately moved.

To this end, the first driving mechanism 400A includes a first driving part 410A installed on the fixed part 110; a first cam part 420A rotated upon operation of the first driving part 410A; and a first rod part 430A rotatably connected to the first cam part 420A and one end of the movable bar 300 to move the movable bar 300 upon rotation of the first cam part 420A.

Here, the first driving part 410A may be a rotation motor, and allows the first rod part 430A to be moved while the first cam part 420A is rotated upon operation of the first driving part 410A In other words, the first rod part 430A has one end rotatably connected to the first cam part 420A, and another end rotatably connected to one end of the movable bar 300, such that the movable bar 300 is moved by pushing the movable bar 300 upon movement by the operation of the first driving part 410A Therefore, the initial position of the first rod part 430A is rotated and moved toward the movable bar 300 upon operation of the first driving part 410A in the state where the first rod part 430A is connected to an upper end or a lower end of the first cam part 420A such that the movable bar 300 is moved.

Here, if a plurality of movable bars 300 are provided, the first cam part 420A is arranged in the same number as the number of movable bars 300, and each first cam part 420A is connected by a first connection rod 440A to be simultaneously rotated by the first driving part 410A.

As described above, if the plurality of movable bars 300 are provided, a plurality of first cam parts 420A are also formed to have the same number as the number of movable bars 300, and the plurality of first cam parts 420A are connected by the first connection rod 440A to be simultaneously rotated. As a result, when the first driving part 410A delivers the rotation force to any one of the first cam parts 420A, the remainder of the first cam parts 420A are connected by the first connection rod 440A to be simultaneously rotated such that the plurality of movable bars 300 may be simultaneously moved.

Meanwhile, the second driving mechanism 400B includes a second driving part 410B installed on the rotation part 120; a second cam part 420B rotated upon operation of the second driving part 410B; and a second rod part 430B rotatably connected to the second cam part 420B and another end of the movable bar 300 to move the movable bar 300 upon rotation of the second cam part 420B.

Here, the second driving part 410B may be the rotation motor, and allows the second rod part 430B to be moved while the second cam part 420B is rotated upon operation of the second driving part 410B. The second driving part 410B is formed to be operated in the same direction as that of the first driving part 410A, such that the movable bar 300 is moved by a force of the first driving part 410A and a force of the second driving part 410B in one direction.

The second rod part 430B has one end rotatably connected to the second cam part 420B and another end rotatably connected to another end of the movable bar 300 such that the movable bar 300 is moved by pushing the movable bar 300 upon movement by the operation of the second driving part 410B. Therefore, the initial position of the second rod part 430B is rotated and moved toward the movable bar 300 upon operation of the second driving part 410B in the state where the second rod part 430B is connected to an upper end or a lower end of the second cam part 420B such that the movable bar 300 is moved.

Here, if the plurality of movable bar 300 are provided, the second cam part 420B is arranged in the same number as the number of movable bars 300, and each cam part is connected by a second connection rod 440B to be simultaneously rotated by the second driving part 410B.

As described above, if the plurality of movable bars 300 are provided, a plurality of second cam parts 420B are also formed to have the same number as the number of movable bars 300, and the plurality of second cam parts 420B are connected by the second connection rod 440B to be simultaneously rotated. As a result, when the second driving part 410B delivers the rotation force to any one of the second cam parts 420B, and the remainder of the second cam parts 420B are connected by the first connection rod 440A to be simultaneously rotated, such that the plurality of movable bars 300 may be simultaneously moved.

An operation of the propeller apparatus of the air mobility according to the present disclosure described above will be described as follows.

As illustrated in FIG. 1, the initial state of the wing 100 is a state where the rotation part 120 is deployed from the fixed part 110.

At this time, as illustrated in FIG. 4, each third rotation center P3 of the movable bar 300 is not matched with the first rotation center P1 and the second rotation center P2 of the hinge mechanism 200. As a result, the rotation of the hinge mechanism 200 is restricted by the movable bar 300, thereby maintaining the state where the rotation part 120 is deployed from the fixed part 110.

In the state, when the signal generated by the crash of the air mobility is input to the driving mechanism 400, the movable bar 300 is moved as the driving mechanism 400 is operated. In other words, as illustrated in FIG. 5, when the movable bar 300 is moved as the driving mechanism 400 is operated, each third rotation center P3 of the movable bar 300 is matched with the first rotation center P1 and the second rotation center P2 of the hinge mechanism 200. As a result, as the rotate of the hinge bar 210 forming the hinge mechanism 200 is allowed, the hinge bar 210 is rotated on the fixed part 110 by the elastic force of the elastomer 220 and at the same time, the rotation part 120 is rotated on the hinge bar 210. Therefore, the rotation part 120 is rotated to be folded on the fixed part 110.

As described above, as illustrated in FIG. 8, when the rotation part 120 is folded, the entire length of the wing 100 is reduced, thereby preventing additional accidents caused by fragments generated by the wing 100 hitting the ground.

Meanwhile, the wing 100 may return to an original position if the rotation part 120 is rotated in the direction of being deployed from the fixed part 110 by the force of overcoming the elastic force of the elastomer 220 after the air mobility lands. As a result, the propeller may be reused by unfolding the folded rotation part 120 from the fixed part 110 in the wing 100.

The propeller apparatus of the air mobility having the aforementioned configuration may fold the propeller when the air mobility crashes, thereby preventing additional accidents caused by the fragments generated by the propeller hitting the ground, and enabling the propeller to be reused by unfolding the folded propeller after the air mobility lands.

While the specific exemplary embodiment of the present disclosure has been illustrated and described, it will be apparent to those skilled in the art that the present disclosure may be variously improved and changed without departing from the technical spirit of the present disclosure provided by the appended claims.

What is claimed is:

1. A propeller apparatus of an air mobility, the propeller apparatus comprising:
  a wing composed of a fixed part and a rotation part deployed from or folded on the fixed Part;
  a hinge mechanism rotatably connected to the fixed part and the rotation part to have a first rotation center of the fixed part and a second rotation center of the rotation part, and providing an elastic force such that the rotation part is folded while being rotated toward the fixed part;
  a movable bar spaced apart from the hinge mechanism to be movably provided, and having a third rotation center selectively matched with the first rotation center and the second rotation center according to a movement position of the movable bar; and
  a driving mechanism installed on the fixed part and the rotation part, connected to the movable bar, allowing the third rotation center of the movable bar not to be matched with the first rotation center and the second rotation center when the rotation part is deployed, and moving the movable bar to allow the third rotation center of the movable bar to be matched with the first rotation center and the second rotation center upon a request for folding of the rotation part, such that the rotation part is rotated by the elastic force of the hinge mechanism.

2. The propeller apparatus of the air mobility according to claim 1,
  wherein the wing is disposed such that an end of the fixed part and an end of the rotation part face each other, and each of the ends of the fixed part and the rotation part is formed with a plurality of opening holes matched with each other and therefore, the hinge mechanism and the movable bar are provided in the opening holes.

3. The propeller apparatus of the air mobility according to claim 2,
  wherein on each of the ends of the fixed part and the rotation part, a guide part extends from an opening hole provided with the movable bar among the plurality of opening holes, and the movable bar is connected to the guide part to be moved on the guide part.

4. The propeller apparatus of the air mobility according to claim 3,
  wherein the movable part has one end and another end rotatably and movably connected to each of the guide parts of the fixed part and the rotation part.

5. The propeller apparatus of the air mobility according to claim 2,
  wherein an opening hole of the plurality of opening holes extends to be longer than a rotation radius of the hinge mechanism and a rotation radius of the movable bar.

6. The propeller apparatus of the air mobility according to claim 1,
  wherein the hinge mechanism comprises:
  a hinge bar having one end connected to the fixed part with the first rotation center and another end connected to the rotation part with the second rotation center; and
  an elastomer provided in the hinge bar to provide an elastic force to the hinge bar in a direction in which the rotation part is folded.

7. The propeller apparatus of the air mobility according to claim 6,
  wherein the elastomer is composed of one side elastomer connected to one end of the hinge bar and the fixed part and another side elastomer connected to the another end of the hinge bar and the rotation part, and one side elastomer and the another side elastomer generate the elastic forces in the direction in which the rotation part is folded.

8. The propeller apparatus of the air mobility according to claim 1,
  wherein the driving mechanism is installed on the fixed part and connected to one end of the movable bar, and a support mechanism connected to another end of the movable bar is installed on the rotation part.

9. The propeller apparatus of the air mobility according to claim 8,
  wherein the driving mechanism comprises:
  a driving part installed on the fixed part;
  a driving cam part rotated upon operation of the driving part; and
  a driving rod part rotatably connected to the driving cam part and one end of the movable bar to move the movable bar upon rotation of the driving cam part.

10. The propeller apparatus of the air mobility according to claim 8,
  wherein the support mechanism comprises:
  a connection cam part rotatably installed on the rotation part; and
  a connection rod part rotatably connected to the connection cam part and another end of the movable bar to support the movable bar and guiding the movable bar moved by an operation of the driving mechanism.

11. The propeller apparatus of the air mobility according to claim 1,
  wherein the driving mechanism is composed of a first driving mechanism installed on the fixed part and connected to one end of the movable bar, and a second driving mechanism installed on the rotation part and connected to another end of the movable bar.

12. The propeller apparatus of the air mobility according to claim 11,
  wherein the first driving mechanism comprises:
  a first driving part installed on the fixed part;
  a first cam part rotated upon operation of the first driving part; and
  a first rod part rotatably connected to the first cam part and one end of the movable bar to move the movable bar upon rotation of the first cam part.

13. The propeller apparatus of the air mobility according to claim 12,
  wherein if a plurality of movable bars are provided, the first cam part is arranged in a same number as that of the movable bar, and the respective first cam parts are connected by a first connection rod to be simultaneously rotated by the first driving part.

14. The propeller apparatus of the air mobility according to claim 11,
  wherein the second driving mechanism comprises:
  a second driving part installed on the rotation part;
  a second cam part rotated upon operation of the second driving part; and
  a second rod part rotatably connected to the second cam part and the another end of the movable bar to move the movable bar upon rotation of the second cam part.

15. The propeller apparatus of the air mobility according to claim 14,
  wherein if a plurality of movable bars are provided, the second cam part is arranged in the same number as that of the movable bar, and the respective cam parts are connected by a second connection rod to be simultaneously rotated by the second driving part.

16. The propeller apparatus of the air mobility according to claim 1, wherein the rotation part is installed to be rotated upward from the fixed part via the hinge mechanism.

17. The propeller apparatus of the air mobility according to claim 1, wherein the driving mechanism is operated such that the movable bar is moved upon receiving a signal generated by the crash of the air mobility through a control part.

\* \* \* \* \*